(12) United States Patent
Klinefelter et al.

(10) Patent No.: US 7,430,762 B2
(45) Date of Patent: Sep. 30, 2008

(54) IDENTIFICATION CARD MANUFACTURING SECURITY

(75) Inventors: Gary M. Klinefelter, Eden Prairie, MN (US); Thomas C. Platner, Eden Prairie, MN (US); Joseph F. Schuler, San Diego, CA (US); Leon Gershenovich, Eden Prairie, MN (US); David W. Kaiser, Centralia, WA (US); Gary R. Holland, Edina, MN (US)

(73) Assignee: Fargo Electronics, Inc., Eden Prairie, MN (US)

( * ) Notice: Subject to any disclaimer, the term of this patent is extended or adjusted under 35 U.S.C. 154(b) by 768 days.

(21) Appl. No.: 10/372,011

(22) Filed: Feb. 21, 2003

(65) Prior Publication Data

US 2003/0216826 A1 Nov. 20, 2003

Related U.S. Application Data

(60) Provisional application No. 60/373,967, filed on Apr. 19, 2002, provisional application No. 60/361,253, filed on Mar. 1, 2002.

(51) Int. Cl.
*G06F 7/04* (2006.01)
*G06K 9/00* (2006.01)
*H04K 1/00* (2006.01)
*H04L 9/00* (2006.01)

(52) U.S. Cl. .............................. 726/30; 713/168; 380/51

(58) Field of Classification Search .................. 705/65, 705/18, 51; 713/168, 155, 179, 193, 190, 713/202; 380/30, 26
See application file for complete search history.

(56) References Cited

U.S. PATENT DOCUMENTS 3,193,430 A 7/1965 Messmer et al. ............ 156/355

(Continued)

FOREIGN PATENT DOCUMENTS

DE 25 35 699 A1 3/1977

(Continued)

OTHER PUBLICATIONS

OrdaCard announces new Internet based high volume secured photo ID card production services, Oct. 1998, Business Wire, Inc.

(Continued)

*Primary Examiner*—Andrew J. Fischer
*Assistant Examiner*—Charles C Agwumezie
(74) *Attorney, Agent, or Firm*—Westman, Champlin & Kelly, P.A.

(57) ABSTRACT

Identification card manufacturing security restricts use of an identification card manufacturing system with only authorized supplies. In accordance with one aspect of the invention, a supply-specific security code (SSSC) and supply-specific data are stored in memory of the supply. The SSSC is translated using the supply-specific data. Finally, the supply is authorized for use with the identification card manufacturing system only when the translated SSSC is found to be valid. In accordance with another aspect of the invention, an identification card manufacturing system is configured to operate only with supplies having corresponding customer-specific security codes (CSSC). A supply CSSC and supply-specific data are retrieved from memory of the supply. Additionally, a system CSSC and system-specific data are retrieved from memory of the identification card manufacturing system. The supply CSSC and the system CSSC are translated using the supply-specific data and the system-specific data, respectively. Finally, the supply is authorized for use with the identification card manufacturing system when the translated system CSSC and the translated supply CSSC correspond.

20 Claims, 5 Drawing Sheets

U.S. PATENT DOCUMENTS

| | | | | |
|---|---|---|---|---|
| 3,446,415 A | 5/1969 | Bromley | | 229/30 |
| 3,761,079 A | 9/1973 | Azure, Jr. | | 271/41 |
| 3,887,106 A | 6/1975 | Charlson et al. | | 221/197 |
| 3,889,472 A | 6/1975 | Guillaud | | 60/698 |
| 3,960,072 A | 6/1976 | Ahlgren et al. | | 101/35 |
| 4,021,032 A | 5/1977 | Gross et al. | | 271/166 |
| 4,068,028 A | 1/1978 | Samonides | | 428/40 |
| 4,146,900 A | 3/1979 | Arnold | | 346/75 |
| 4,179,732 A | 12/1979 | Khan et al. | | 364/200 |
| 4,282,583 A | 8/1981 | Khan et al. | | 364/900 |
| 4,313,683 A | 2/1982 | Brown et al. | | 400/225 |
| 4,393,386 A | 7/1983 | De Guilio | | 346/75 |
| 4,534,313 A | 8/1985 | Louvel | | 118/696 |
| 4,604,631 A | 8/1986 | Jinnai et al. | | 346/1.1 |
| 4,617,080 A | 10/1986 | Kobayashi et al. | | 156/359 |
| 4,680,596 A | 7/1987 | Logan | | 346/140 |
| 4,685,702 A | 8/1987 | Kazuharu | | 283/81 |
| 4,686,540 A | 8/1987 | Leslie et al. | | 346/33 |
| 4,716,346 A | 12/1987 | Matsuo | | 318/38 |
| 4,719,626 A | 1/1988 | Ogasawara | | 371/16 |
| 4,734,868 A | 3/1988 | DeLacy | | 364/519 |
| 4,750,743 A | 6/1988 | Nicoletti | | 273/148 |
| 4,781,985 A | 11/1988 | Desjarlais | | 428/421 |
| 4,827,425 A | 5/1989 | Linden | | 700/225 |
| 4,864,618 A * | 9/1989 | Wright et al. | | 380/51 |
| 4,938,830 A | 7/1990 | Cannistra | | 156/270 |
| 4,961,088 A | 10/1990 | Gilliland et al. | | 355/206 |
| 5,018,614 A | 5/1991 | Ruckert | | 194/236 |
| 5,025,399 A | 6/1991 | Wendt et al. | | 358/1.18 |
| 5,027,135 A | 6/1991 | Negishi et al. | | 346/154 |
| 5,161,233 A | 11/1992 | Matsuo et al. | | 355/218 |
| 5,184,181 A | 2/1993 | Kurando et al. | | 355/260 |
| 5,238,524 A | 8/1993 | Seki et al. | | 156/538 |
| 5,266,968 A | 11/1993 | Stephenson | | 346/76 |
| 5,267,800 A | 12/1993 | Petteruti et al. | | 400/88 |
| 5,277,501 A | 1/1994 | Tanaka et al. | | 400/120 |
| 5,290,067 A | 3/1994 | Langen | | 283/60.1 |
| 5,318,370 A | 6/1994 | Nehowig | | 400/613 |
| 5,327,201 A | 7/1994 | Coleman et al. | | 355/278 |
| 5,368,677 A | 11/1994 | Ueda et al. | | 156/362 |
| 5,373,146 A * | 12/1994 | Lei | | 235/382.5 |
| 5,378,884 A | 1/1995 | Lundstrom et al. | | 235/441 |
| 5,410,642 A | 4/1995 | Hakamatsuka et al. | | 395/113 |
| 5,412,779 A | 5/1995 | Motoyama | | 395/275 |
| 5,413,532 A | 5/1995 | Raby | | 462/2 |
| 5,437,960 A | 8/1995 | Negate et al. | | 430/256 |
| 5,441,921 A | 8/1995 | Verdonck et al. | | 503/227 |
| 5,455,611 A | 10/1995 | Simon et al. | | 347/49 |
| 5,466,319 A | 11/1995 | Zager et al. | | 156/220 |
| 5,484,502 A | 1/1996 | Bozanic | | 156/235 |
| 5,516,218 A | 5/1996 | Amano et al. | | 400/535 |
| 5,534,857 A | 7/1996 | Laing et al. | | 340/5.74 |
| 5,537,554 A | 7/1996 | Motoyama | | 395/280 |
| 5,544,289 A | 8/1996 | Motoyama | | 395/280 |
| 5,550,735 A | 8/1996 | Slade et al. | | 364/401 |
| 5,550,984 A | 8/1996 | Gelb | | 395/200.17 |
| 5,552,994 A | 9/1996 | Cannon et al. | | 364/468.01 |
| 5,568,618 A | 10/1996 | Motoyama | | 395/280 |
| 5,573,621 A | 11/1996 | Boreali | | 156/256 |
| 5,617,528 A | 4/1997 | Stechmann et al. | | 715/517 |
| 5,630,581 A | 5/1997 | Rodesch | | 271/23 |
| 5,637,174 A | 6/1997 | Field et al. | | 156/256 |
| 5,646,388 A | 7/1997 | D'Entremont et al. | | 235/380 |
| 5,649,120 A | 7/1997 | Motoyama | | 395/280 |
| 5,673,076 A | 9/1997 | Nardone et al. | | 347/171 |
| 5,695,589 A | 12/1997 | German et al. | | 156/250 |
| 5,709,484 A | 1/1998 | Dorner | | 400/188 |
| 5,715,381 A | 2/1998 | Hamilton | | 395/114 |
| 5,717,776 A | 2/1998 | Watanabe | | 382/116 |
| 5,727,137 A | 3/1998 | LeClair et al. | | 375/116 |
| 5,745,036 A | 4/1998 | Clare | | 340/572 |
| 5,758,184 A | 5/1998 | Lucovsky et al. | | 395/826 |
| 5,768,143 A | 6/1998 | Fujimoto | | 364/479 |
| 5,768,483 A | 6/1998 | Maniwa et al. | | 395/114 |
| 5,768,495 A | 6/1998 | Campbell et al. | | 395/183.01 |
| 5,771,058 A | 6/1998 | Kobayashi | | 347/218 |
| 5,771,071 A | 6/1998 | Bradley et al. | | 348/335 |
| 5,771,382 A | 6/1998 | Wang et al. | | 395/670 |
| 5,774,678 A | 6/1998 | Motoyama | | 395/280 |
| 5,783,024 A | 7/1998 | Forkert | | 156/351 |
| 5,785,224 A | 7/1998 | Nawakowski | | 225/4 |
| 5,796,420 A | 8/1998 | Kaerts et al. | | 347/188 |
| 5,805,810 A | 9/1998 | Maxwell | | 395/200.36 |
| 5,807,461 A | 9/1998 | Hagstrom | | 156/361 |
| 5,819,110 A | 10/1998 | Motoyama | | 395/835 |
| 5,822,534 A | 10/1998 | Yamunachari et al. | | 395/200.54 |
| 5,828,567 A | 10/1998 | Eryurek et al. | | 364/184 |
| 5,835,911 A | 11/1998 | Nakagawa et al. | | 707/203 |
| 5,837,991 A | 11/1998 | LaManna et al. | | 235/475 |
| 5,850,901 A | 12/1998 | Schuster et al. | | 198/370.05 |
| 5,860,068 A | 1/1999 | Cook | | 705/26 |
| 5,862,260 A | 1/1999 | Rhoads | | 382/232 |
| 5,873,606 A | 2/1999 | Haas et al. | | 283/75 |
| 5,874,145 A | 2/1999 | Waller | | 428/42.1 |
| 5,884,014 A | 3/1999 | Huttenlocher et al. | | 395/114 |
| 5,886,334 A * | 3/1999 | D'Entremont et al. | | 235/380 |
| 5,887,216 A | 3/1999 | Motoyama | | 399/8 |
| 5,889,866 A | 3/1999 | Cyras et al. | | 380/49 |
| 5,889,941 A | 3/1999 | Tushie et al. | | 725/26 |
| 5,936,542 A | 8/1999 | Kleinrock et al. | | 340/825.34 |
| 5,941,414 A | 8/1999 | Kasper | | 221/210 |
| 5,941,522 A | 8/1999 | Hagstrom et al. | | 271/225 |
| 5,962,832 A | 10/1999 | Dorner | | 235/380 |
| 5,973,692 A | 10/1999 | Knowlton et al. | | 345/348 |
| 5,980,011 A | 11/1999 | Cummins et al. | | 347/4 |
| 6,014,748 A | 1/2000 | Tushie et al. | | 726/9 |
| 6,022,429 A | 2/2000 | Hagstrom | | 156/64 |
| 6,033,832 A | 3/2000 | Wingender | | 430/373 |
| 6,070,146 A | 5/2000 | Mimata | | 705/13 |
| 6,100,804 A | 8/2000 | Brady et al. | | 340/572.7 |
| 6,182,136 B1 | 1/2001 | Ramanathan et al. | | 709/224 |
| 6,189,103 B1 | 2/2001 | Nevarez et al. | | 713/201 |
| 6,196,459 B1 | 3/2001 | Goman et al. | | 235/380 |
| 6,199,753 B1 | 3/2001 | Tracy et al. | | 235/375 |
| 6,219,669 B1 | 4/2001 | Haff et al. | | |
| 6,220,511 B1 | 4/2001 | Holec et al. | | 235/380 |
| 6,233,683 B1 | 5/2001 | Chan et al. | | 713/172 |
| 6,272,472 B1 | 8/2001 | Danneels et al. | | 705/27 |
| 6,292,092 B1 * | 9/2001 | Chow et al. | | 340/5.6 |
| 6,298,336 B1 | 10/2001 | Davis et al. | | 705/41 |
| 6,335,799 B1 | 1/2002 | Provost | | 358/1.4 |
| 6,367,011 B1 | 4/2002 | Lee et al. | | 713/172 |
| 6,386,772 B1 | 5/2002 | Klinefelter et al. | | 400/208 |
| 6,554,512 B2 | 4/2003 | Heno et al. | | 400/625 |
| 6,582,141 B2 | 6/2003 | Meier et al. | | 400/701 |
| 6,584,564 B2 | 6/2003 | Olkin et al. | | 713/152 |
| 6,631,967 B1 | 10/2003 | Saruta | | 347/19 |
| 6,632,250 B1 | 10/2003 | Lynch et al. | | |
| 6,633,405 B1 * | 10/2003 | Nguyen | | 358/1.16 |
| 6,644,771 B1 | 11/2003 | Silverbrook | | 347/19 |
| 6,647,871 B2 | 11/2003 | Morand | | 101/33 |
| 6,662,999 B1 | 12/2003 | Vancour et al. | | 235/375 |
| 6,663,100 B2 | 12/2003 | Crowley | | 271/165 |
| 6,668,322 B1 | 12/2003 | Wood et al. | | 713/182 |
| 6,694,884 B2 | 2/2004 | Klinefelter et al. | | 101/484 |
| 6,695,205 B1 | 2/2004 | Lundstrom et al. | | 235/380 |
| 6,711,678 B2 | 3/2004 | Ferguson | | 713/153 |
| 6,732,101 B1 | 5/2004 | Cook | | 707/10 |
| 6,732,148 B1 | 5/2004 | Estrada et al. | | 709/205 |
| 6,738,903 B1 * | 5/2004 | Haines | | 713/168 |
| 6,758,616 B2 | 7/2004 | Pribula et al. | | 400/624 |
| 6,783,067 B2 | 8/2004 | Kreuter et al. | | 235/381 |
| 6,788,800 B1 | 9/2004 | Carr et al. | | 382/100 |
| 6,792,544 B2 | 9/2004 | Hashem et al. | | 713/201 |

| | | | |
|---|---|---|---|
| 6,826,609 B1 | 11/2004 | Smith et al. | 709/225 |
| 6,850,900 B1 | 2/2005 | Hare et al. | 705/26 |
| 6,850,911 B1 | 2/2005 | Huether | 705/51 |
| 6,856,975 B1 | 2/2005 | Inglis | 705/51 |
| 6,902,107 B2 | 6/2005 | Shay et al. | 235/381 |
| 6,929,413 B2 * | 8/2005 | Schofield | 400/103 |
| 6,932,527 B2 | 8/2005 | Pribula et al. | 400/621 |
| 7,070,100 B2 | 7/2006 | Davie et al. | 235/440 |
| 2001/0008253 A1 | 7/2001 | Holec et al. | 235/381 |
| 2001/0053947 A1 | 12/2001 | Lenz et al. | 700/117 |
| 2002/0051167 A1 | 5/2002 | Francis et al. | 385/1.14 |
| 2002/0072998 A1 | 6/2002 | Haines et al. | 705/28 |
| 2002/0116301 A1 | 8/2002 | Chapman et al. | 705/29 |
| 2002/0171728 A1 | 11/2002 | Pribula et al. | 347/104 |
| 2002/0180993 A1 | 12/2002 | Klinefelter et al. | 358/1.1 |
| 2003/0023703 A1 | 1/2003 | Hayward et al. | 709/217 |
| 2003/0046171 A1 | 3/2003 | Whale | 705/26 |
| 2003/0059050 A1 | 3/2003 | Hohberger et al. | 380/270 |
| 2003/0139973 A1 | 7/2003 | Claremont et al. | 705/26 |
| 2003/0152409 A1 | 8/2003 | Pribula et al. | 400/718 |
| 2003/0164982 A1 | 9/2003 | Lien | 358/1.18 |
| 2003/0167213 A1 | 9/2003 | Jammes et al. | 705/27 |
| 2003/0182587 A1 | 9/2003 | Morrison et al. | 713/202 |
| 2004/0022572 A1 | 2/2004 | Bungert et al. | 400/248 |
| 2004/0109715 A1 | 6/2004 | Meier et al. | 400/191 |
| 2005/0006460 A1 | 1/2005 | Kreuter | |
| 2005/0060239 A1 | 3/2005 | Holland | 705/26 |
| 2006/0191022 A1 * | 8/2006 | Hohberger et al. | 726/30 |

FOREIGN PATENT DOCUMENTS

| | | |
|---|---|---|
| DE | 196 44 306 A1 | 5/1998 |
| EP | 0 195 104 A1 | 9/1986 |
| EP | 0 278 517 A2 | 8/1988 |
| EP | 0 562 979 A2 | 9/1993 |
| EP | 0 562 979 A3 | 9/1993 |
| EP | 0 597 135 A1 | 5/1994 |
| EP | 0 659 588 A2 | 6/1995 |
| EP | 0 887 197 A2 | 12/1998 |
| EP | 0 924 597 A2 | 6/1999 |
| EP | 0 887 197 A3 | 5/2000 |
| EP | 1488303 B1 | 3/2003 |
| FR | 2 667 416 | 4/1992 |
| GB | 2 120 821 A | 12/1983 |
| JP | 8-187921 A | 7/1996 |
| JP | 2001-24838 | 1/2001 |
| JP | 2001-215231 | 8/2001 |
| WO | WO 86/07480 | 12/1986 |
| WO | WO 955/09084 | 4/1995 |
| WO | WO 96/39656 | 12/1996 |
| WO | WO 98/52762 | 11/1998 |
| WO | WO 98/51508 | 12/1998 |
| WO | WO 99/21713 | 5/1999 |
| WO | WO 99/49379 | 9/1999 |
| WO | WO 00/43932 | 7/2000 |
| WO | WO 03/059632 A1 | 12/2002 |
| WO | WO 03/060811 A2 | 12/2002 |
| WO | WO 03/079168 A3 | 3/2003 |
| WO | WO 2003/019459 A3 | 3/2003 |
| WO | WO 03/079168 A2 | 9/2003 |
| WO | WO 2004/027715 | 9/2003 |
| WO | WO 2004/011268 A1 | 2/2004 |

OTHER PUBLICATIONS

DataCard Debuts Image and Data Retrieval Software for Enterprise Applications, Apr. 1998, Business Wire, Inc.
www.SmartIDCard.com, Jul. 2002, 4 pages, "Card Printing Service" 5 pages, Smart ID Card—Card Printing Services, ID Cards, Card Supplies, Smart Card Solutions.
UbiQ Smart Card Software Makes New Fargo Printers Complete Card-Issuance Systems Issuers Can Print and Personalize Smart Cards Using Pro Series ID Card Printers Combined with Ubiq's Personalization Software, Apr. 1998.
International Search Report and Written Opinion of PCT Application No. PCT/US2005/15176 filed May 3, 2005; mailed Nov. 30, 2006.
Office Communication from U.S. Appl. No. 10/126,428, filed Apr. 19, 2002, Date of Mailing: Jul. 27, 2006.
Harold S. Stone, Microcomputer Interfacing, 1982, Addison-Wesley, pp. 1-2, 1982.
International Search Report for International Application No. PCT/US 03/06187, filed Feb. 28, 2003. Search Report date of Jul. 18, 2003.
Anon, "Instantly Re-Order Toner Cartridges Online Using HP's Smartchip," M2 Presswire, Oct. 19, 2001, 2 pages.
Office Communication for U.S. Appl. No. 10/937,739, filed Sep. 9, 2004, date of mailing Apr. 26, 2005.
Office Communication from U.S. Appl. No. 10/176,096, filed Jun. 20, 2002, Date of Mailing: Apr. 6, 2006.
Office Communication for U.S. Appl. No. 10/372,071, filed Feb. 21, 2003. Date of Mailing Feb. 15, 2005.
Office Communication from U.S. Appl. No. 10/937,739 filed Sep. 9, 2004, Date of Mailing: Nov. 22, 2005.
U.S. Appl. No. 11/232,427, filed Sep. 21, 2005.
U.S. Appl. No. 11/120,621, filed May 3, 2005.
Office Communication for U.S. Appl. No. 10/126,441, filed Apr. 19, 2002, date of mailing: Sep. 15, 2004.

* cited by examiner

US 7,430,762 B2

IDENTIFICATION CARD MANUFACTURING SECURITY

CROSS REFERENCE TO RELATED APPLICATION

The present application claims the benefit of U.S. Provisional Patent Application Ser. No. 60/373,967, filed Apr. 19, 2002 and U.S. Provisional Patent Application Ser. No. 60/361,253, filed Mar. 1, 2002, the contents of which are hereby incorporated by reference in their entirety.

FIELD OF THE INVENTION

The present invention generally relates to identification card manufacturing and, more particularly, to security for identification card manufacturing systems to prevent unauthorized use of identification card manufacturing devices and corresponding supplies.

BACKGROUND OF THE INVENTION

Identification card manufacturing systems generally include a computer, at least one card manufacturing application running on the computer, and at least one identification card manufacturing device such as an identification card printer or laminator. In the case of an identification card printer, the card manufacturing application can combine textual and graphical information to form a print job corresponding to an image that is to be printed by the identification card printer. The print job can then be processed by the identification card printer by printing an image to a card substrate fed from a card supply using a thermal print mechanism or an ink jet print mechanism. The thermal print mechanism utilizes a thermal print ribbon supply, whereas the ink jet print mechanism utilizes an ink cartridge supply. When the identification card manufacturing device is a laminator, the card producing application can control the operation of the identification card laminator to laminate the printed card using an overlaminate supply. Other identification card processing devices, such as data encoders and card flippers, can also be controlled by the identification card manufacturing application.

Security from counterfeiting of identification cards is in high demand. Methods of providing such security have been employed to produce an identification card that is made difficult to copy or modify. For example, printed identification cards can be laminated with an overlaminate supply that includes custom security markings, such as holograms. Also, the identification card can include special layers of materials that reveal attempts to tamper with the card. However, such an investment in customized supplies can provide a false sense of security from counterfeiting.

For example, the above methods of enhancing security from counterfeiting and tampering can be overcome by a counterfeiter that gains access to the custom supplies. The counterfeiter can then obtain an identification card manufacturing system and use the custom supplies to possibly generate undetectable counterfeit identification cards.

A continuing need exists for improved identification card manufacturing security and, more particularly, improved security from identification card counterfeiting.

SUMMARY OF THE INVENTION

The present invention improves identification card manufacturing security by restricting an identification card manufacturing system to operate only with authorized supplies. In accordance with this aspect of the invention, a supply-specific security code (SSSC) and supply-specific data are stored in memory of the identification card manufacturing system supply. The SSSC is translated using the supply-specific data. Finally, the supply is authorized for use with the identification card manufacturing system only when the translated SSSC is found to be valid. In this manner, the identification card manufacturing system can be precluded from operating with supplies that are determined to be invalid.

In accordance with another aspect of the invention, identification card manufacturing systems are configured to operate only with supplies having corresponding customer-specific security codes (CSSC). In accordance with this aspect of the invention, a supply CSSC and supply-specific data are retrieved from memory of the supply. Additionally, a system CSSC and system-specific data are retrieved from memory of the identification card manufacturing system. The supply CSSC and the system CSSC are translated using the supply-specific data and the system-specific data, respectively. Finally, the supply is authorized for use with the identification card manufacturing system when the translated system CSSC and the translated supply CSSC correspond.

Another aspect of the present invention is directed to a method of configuring an identification card manufacturing system to operate only with supplies having corresponding CSSC's. Here, a CSSC is generated for a customer. Next, the CSSC is stored in a secure data base and in memory of an supply. Finally, the identification card manufacturing system is configured to operate only with supplies having the CSSC.

DETAILED DESCRIPTION OF THE DRAWINGS

Figure 1:
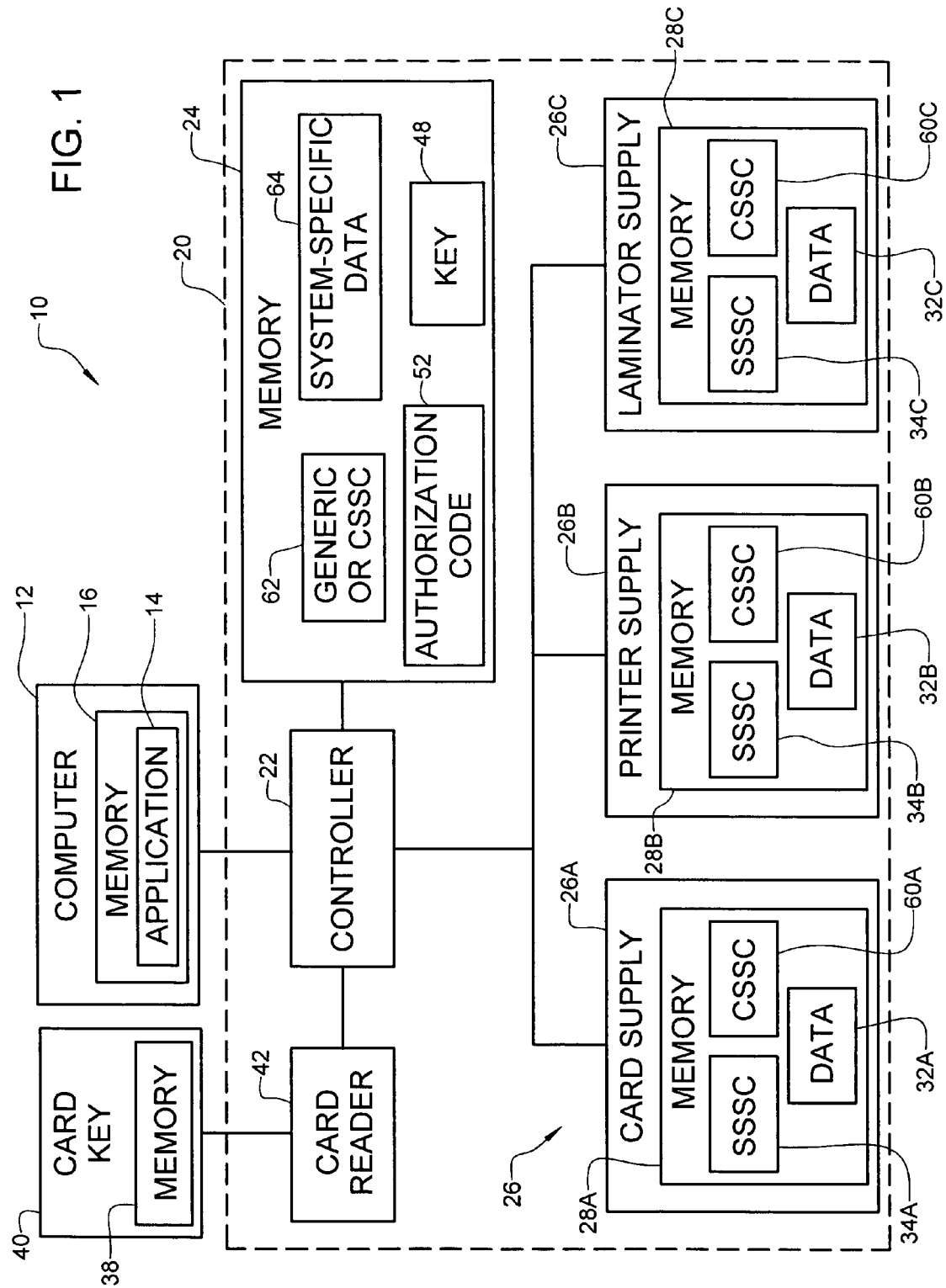
FIG. 1 is a simplified diagram of an identification card manufacturing system in accordance with embodiments of the invention.

FIG. 1 is a schematic diagram of an identification card manufacturing system 10, in accordance with embodiments of the invention. System 10 generally includes a computer 12 having a card manufacturing application and driver software 14 stored in memory 16. System 10 also includes an identification card manufacturing device 20 that is controlled by application 14 to process an identification card in some manner. One alternative to system 10 of FIG. 1 is to configure identification card manufacturing device 20 to include a microcomputer that is capable of executing the application 14 in order to eliminate the need for a separate computer 12.

Identification card manufacturing device 20 includes a controller 22, memory 24 and one or more supplies that are generally designated as 26. Controller 22 receives instructions from application and driver software 14 to process an identification card accordingly. Device 20 can be an identification card printer, an identification card laminator, or other card manufacturing device. The printing, laminating and other card processing components of device 20 are not shown to simplify the illustration and the discussion of the invention.

Supply 26 can include a card supply 26A, a printer supply 26B, a laminator supply 26C or other card manufacturing supply. Card supply 26A can include a card cartridge or card holder that includes a supply of individual identification cards for feeding to a card processing component of device 20. Printer supply 26B can be a thermal print ribbon for use with a thermal printhead, or an ink cartridge for use with an ink jet printhead. Laminator supply 26C can be a supply of overlaminate material for use with a laminator that is applied to a surface of a card.

Each of the supplies 26 includes a memory 28 that is accessible by controller 22 through a supply reader 30. Supply reader 30 can communicate with the memory 28 of each supply 26 through a direct electrical connection or through a wireless connection using radio frequency (RF) communication methods and provide data contained therein to controller 22. Controller 22 can analyze the data and/or communicate the data to application 14.

The data contained in the memory 28 of the supplies 26 can include general information about the supply. For example, memory 28 can include information as to whether the supply 26 is a card supply 26A, a printer supply 26B, a laminator supply 26C or other type of supply. Additionally, general supply information such as the number of cards contained in the new card supply 26A, the amount of ink or type of ink stored in the printer supply 26B, and the amount of overlaminate material and type of overlaminate material stored in the laminator 26C. Additionally, the data can include supply-specific data 32 that relates to the specific supply. This supply-specific data can include, for example, a unique serial number, unique date information (e.g., expiration date, date produced, date shipped, etc.), and other data that is substantially unique to the particular supply.

In accordance with an embodiment of the invention, memory 28 includes a supply-specific security code (SSSC) 34 that is either encoded using the supply-specific data 32, such as the serial number, or is encrypted using the supply-specific data 32 and a private key that is not stored in the supply memory 28. As a result, the SSSC is unique for each supply 26. That is, SSSC 34A of card supply 26A is different from SSSC 34B of printer supply 26B and SSSC 34C of laminator supply 26C, as well as other card supplies. The private key used to encrypt the SSSC 34 can be stored, for example, in memory 24 of card manufacturing device 20 as indicated at 36, in memory 16 of computer 12, or contained in memory 38 of a card key 40 that can be read by a card reader 42.

Figure 2:
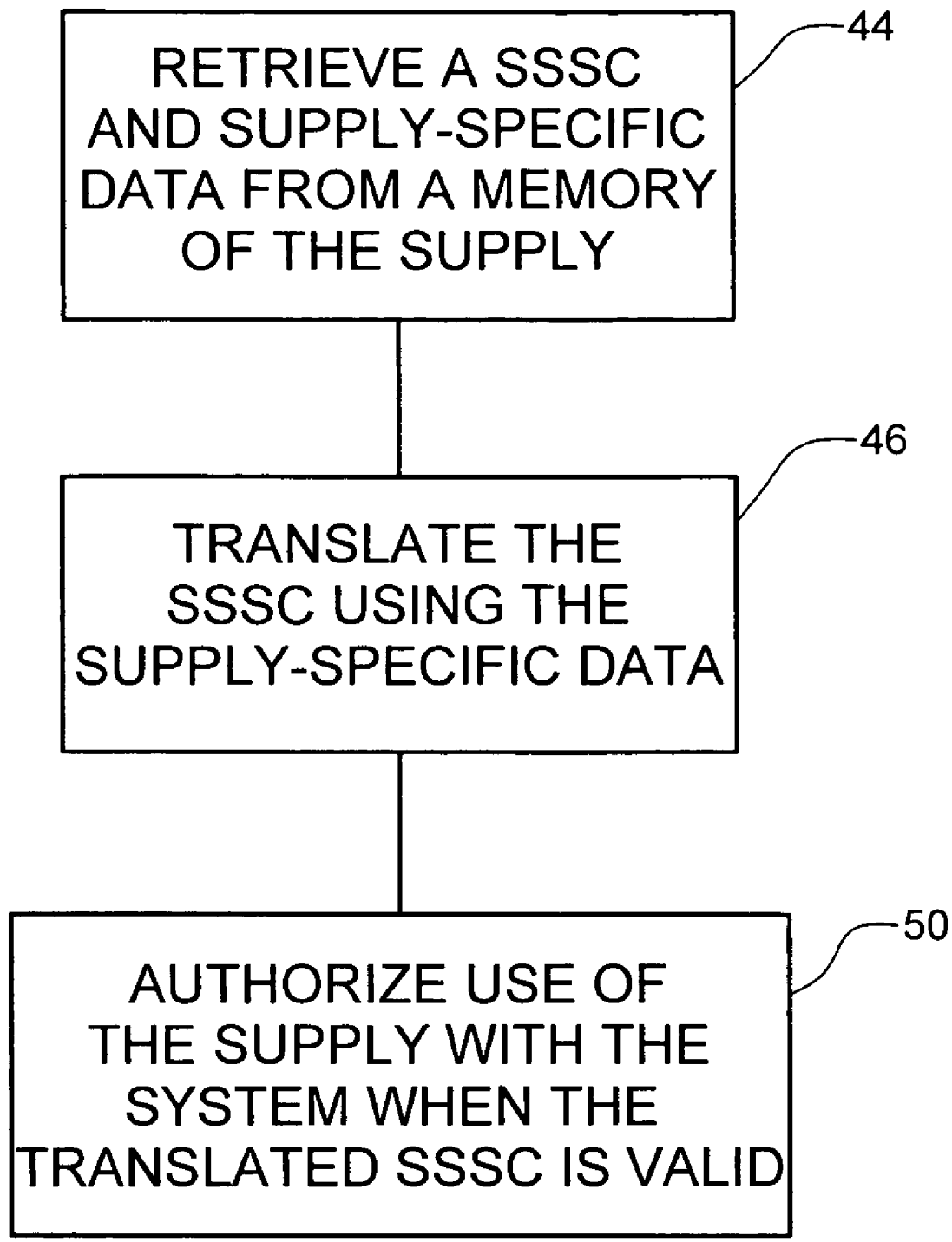
FIG. 2 is a flowchart illustrating a security check performed in accordance with an embodiment of the invention.

In accordance with one embodiment of the invention, a first level security check is performed in accordance with the flowchart illustrated in FIG. 2. At step 44, SSSC 34 and supply-specific data 32 are retrieved from memory 28 of a card supply 26. This is generally accomplished using supply reader 30 under control of controller 22. Next, at step 46, the SSSC 34 is translated using the supply-specific data 32. This can be accomplished by controller 22 or by computer 12 in accordance with instructions from application 14. This translation of SSSC 34 generally involves deciphering or decoding SSSC 34 using supply-specific data 32 in accordance with a predefined algorithm. Alternatively, SSSC 34 can be decrypted using the supply-specific data 32 and a corresponding private key 48 stored in system memory 24 or other locations as described above.

At step 50, use of the supply 26 with the identification card manufacturing system 10 is authorized when the translated SSSC 34 is determined to be valid. In accordance with one embodiment, this authorizing step involves comparing the translated SSSC 34 of the supply 26 to an authorization code 52 stored in system memory 24. The translated SSSC 34 is determined to be valid when it matches or otherwise corresponds to the authorization code 52. If found to be valid, identification card manufacturing system 10 can be enabled for operation with the supply 26. If the supply 26 is found to be invalid, system 10 can trigger an interlocking mechanism using, for example controller 22, to preclude operation of system 10 with the invalid supply 26.

In accordance with another aspect of the present invention, identification card manufacturing system 10 can be configured to operate only with supplies 26 that have been customized for use by a particular customer. In accordance with one embodiment, both the supply 26 and the identification card manufacturing system 10 include a customer-specific security code (CSSC). The supply CSSC 60 stored in supply memory 28 is either encoded using the supply-specific data 32 or is encrypted using the supply-specific data 32 and a private key that is preferably different from the private key (key 48) of memory 24 used to encrypt the SSSC 34.

Similarly, a system CSSC 62 is stored in system memory 24. Memory 16 can also operate as a system memory storing the system CSSC and other information described below. The system CSSC 62 is preferably encoded using system-specific data 64, or encrypted using system-specific data 64 and a private key that is preferably different from the private key used to encrypt the supply CSSC 60 of the supply 26. The system CSSC 62 can take the form of a device CSSC corresponding to device 20 that is preferably stored as shown in memory 24, or an application CSSC 62 corresponding to application 14 that is preferably stored in memory 16 of computer 12. System 10 can utilize both application and device CSSC's 62. The system-specific data 64 is a serial number or other information that uniquely identifies device 20 (device-specific data) or application 14 (application-specific data) of system 10. The private keys used to encrypt the supply and system CSSC's are preferably stored outside of supply memory 28 or system memory 24. In accordance with one embodiment, the private key used in encrypt the supply and system CSSC's is stored in memory 37 of card key 38.

Figure 3:
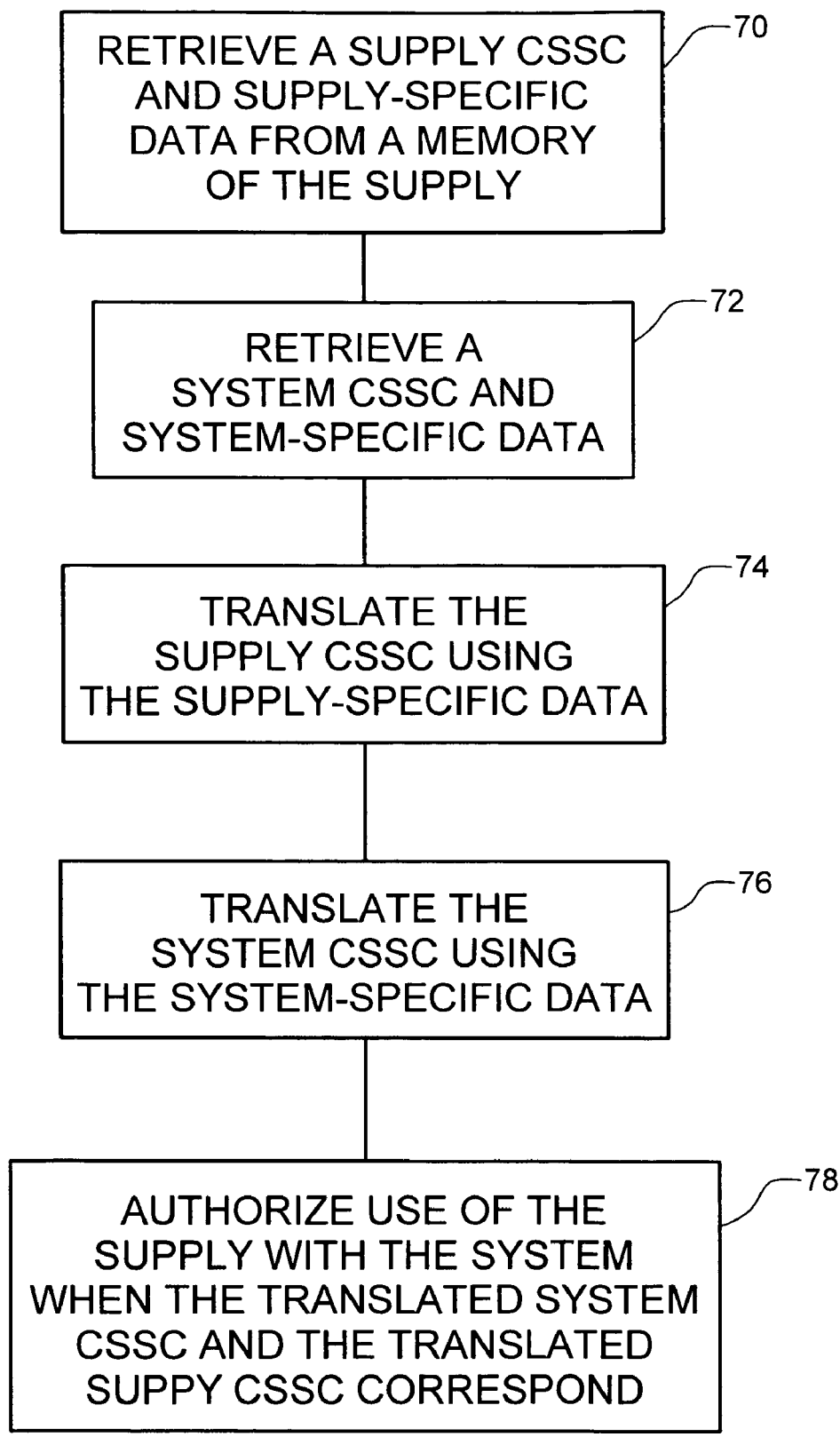
FIG. 3 is a flowchart illustrating a security check in accordance with an embodiment of the invention.

FIG. 3 is a flowchart illustrating operation of the system 10 with a supply 26 having a supply CSSC 60. At step 70, a supply CSSC 60 and supply-specific data 32 are retrieved from memory 28 of supply 26. As discussed above, this reading of memory 28 can be accomplished through supply reader 30 by controller 22. The supply CSSC 60 and supply-specific data 32 can be analyzed by controller 22 or by computer 12 in accordance with instructions from application 14. Next, at 72, a system CSSC 62 and system-specific data 64 are retrieved from memory 24 of identification card manufacturing system 10. The supply CSSC 60 is translated using the supply-specific data 32 at 174. As discussed above, this can be accomplished by controller 22 or application 14. Similarly, the system CSSC 62 is translated using the system-specific data 64, at 76. Finally, at 78, use of the supply 26 with the system 10 is authorized when the translated system CSSC 62 and the translated supply CSSC 60 correspond.

Prior to the first use of identification card manufacturing system 10 with a customized supply, the system 10 may be set up as a generic system. Accordingly, the initial system CSSC 62 mentioned above could be in the form of a generic code. In accordance with one embodiment, the first use of identification card system 10 with a customized supply 26 causes the generic code to be replaced with a system CSSC that is preferably generated using the translated supply CSSC 60 and system specific data 64.

The translations of the supply CSSC 60 and the system CSSC 62 can be accomplished as described above by deciphering or decoding the CSSC's using the corresponding supply-specific data 32 and the system-specific data 64. Alternatively, the translating steps can be accomplished by decrypting the system CSSC 62 and the supply CSSC 60 using an appropriate private key. For example, the supply CSSC 60 can be decrypted using a private key that is stored in memory 37 of card key 38 or in system memory 24.

Figure 4:
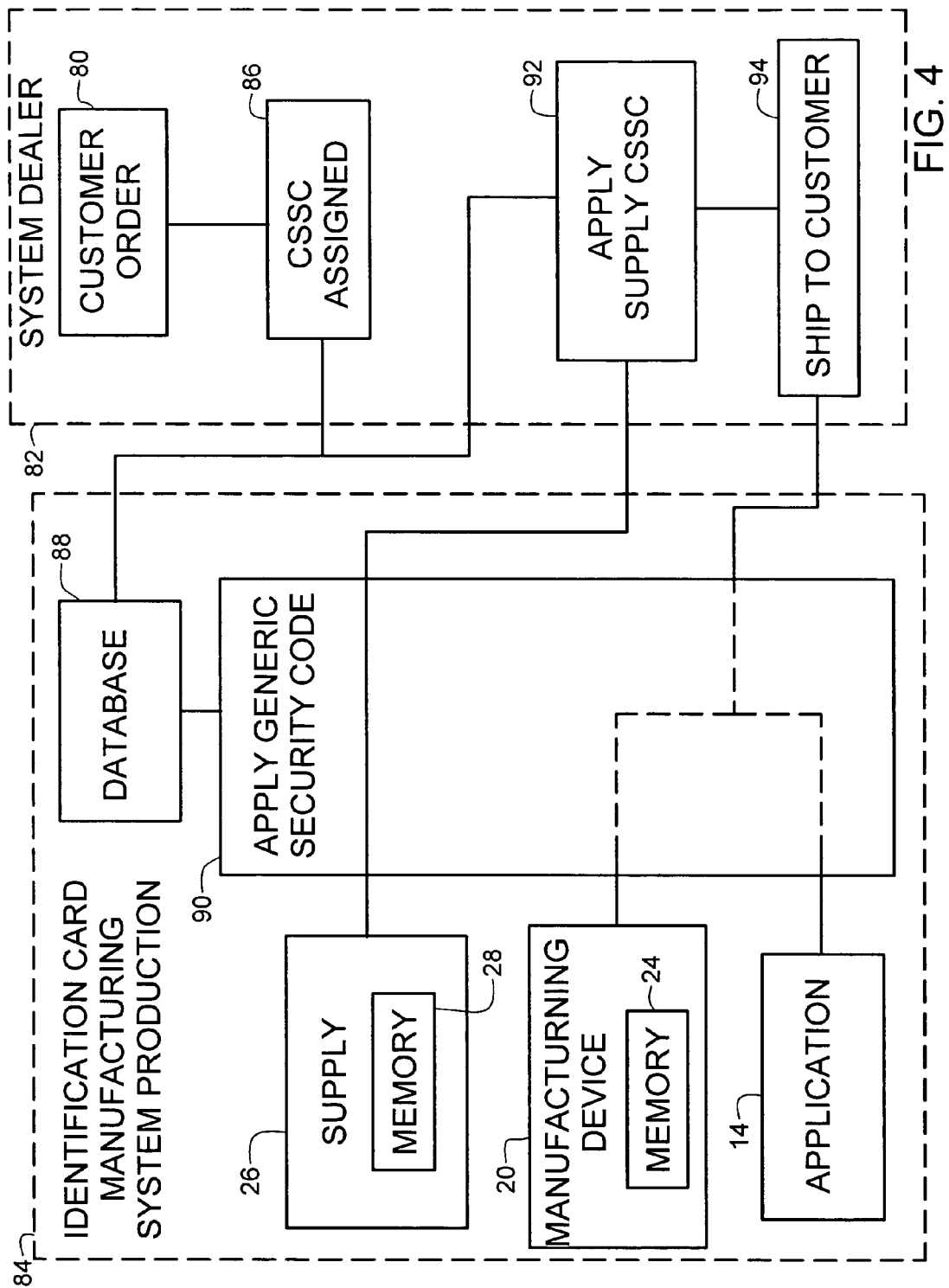
FIG. 4 is a simplified block diagram illustrating a method in which custom supplies and their corresponding identification card manufacturing systems are formed.

FIG. 4 is a simplified block diagram illustrating a method in which custom supplies 26 and their corresponding systems 10 including card manufacturing device 20 and application and driver software 14 are formed. Initially, a customer requests to be provided a custom system 10 with custom card manufacturing supplies 26, as indicated at box 80. The customer's order is typically provided to a dealer 82 of the identification card manufacturing systems 10 and supplies 26, or directly to the manufacturer 84 of the devices 20 and supplies 26. Once the order is made, the customer is assigned a secret CSSC as indicated at box 86, which is then stored in a secure database 88. This feature allows a specific custom supply 26 to be matched to the corresponding custom device 20 and/or application 14.

Identification card manufacturing devices 20 and supplies 26 are preferably initially programmed to operate as generic devices by applying or storing a generic security code in the respective memories 24 and 28, or in the data of the application 14, as indicated at box 90. A supply CSSC 60 corresponding to the CSSC assigned to the customer is then programmed into memory 28 of supply 26 as indicated at box 92. As mentioned above, the supply CSSC 60 is preferably encoded or encrypted using the supply specific data 34 that is unique to the supply 26.

In accordance with one embodiment, card manufacturing device 20 can also be programmed with the CSSC assigned to the customer by storing it in memory 24 and/or including it in the application 14. Alternatively, the installation of a custom supply 26 having a CSSC 60 automatically causes the generic security code of the device 20 or application 14 to be updated to correspond to the supply CSSC. This allows generic devices 20 that are already in the possession of the customer to be updated to operate as custom devices. Once this occurs, the device 20 will only operate with custom supplies 26 having the corresponding supply CSSC 60.

As mentioned above, it is also possible for the customer to obtain custom devices 20 and supplies 26 through an authorized dealer 82. Here, generic devices 20 and supplies 26 are shipped to the dealer 82 from the manufacturer 84. For new customers, the dealer can request a secret CSSC for the customer from the manufacturer 82, which is then stored in the secure database 88. When customers with assigned CSSC's submit new orders to the dealer 82, the dealer 82 may access the database 84 and retrieve the CSSC corresponding to the customer. The CSSC can then be applied to the supply 26 or the device 20 prior to shipment to the customer by the dealer as indicated at box 94.

It should be understood that the dealer can actually be treated as the customer where the manufacturer of the systems provides the dealer with a unique CSSC. The dealer then provides systems 10 and supplies 26 that all operate with devices 20, applications 14, and supplies 26 having the corresponding CSSC's.

In summary, card manufacturing supplies 26 and identification card manufacturing devices 20 and applications 14 can be configured to include a secret CSSC relating to a customer, which limits their use only with corresponding custom components. Initially, a CSSC is generated at 86 for a customer. The CSSC can be based upon a customer order 80. Next, the CSSC is stored in a secure database 88 and in memory 28 of the card manufacturing supply 26, as indicated at 92. Finally, the identification card manufacturing system 10 including identification card manufacturing application 14 and device 20 are configured to operate only with supplies 26 having a CSSC. This can be accomplished either by storing the corresponding CSSC 62 in the memory 24 of the device 20 or in the data system of the application 14, or by generating the system CSSC 62 automatically when the generic device 20 or application 14 is used with the custom supply 26 for the first time. Following such a use, the identification card manufacturing system 10 is configured to only operate with the custom supplies 26 having the corresponding CSSC.

Figure 5:
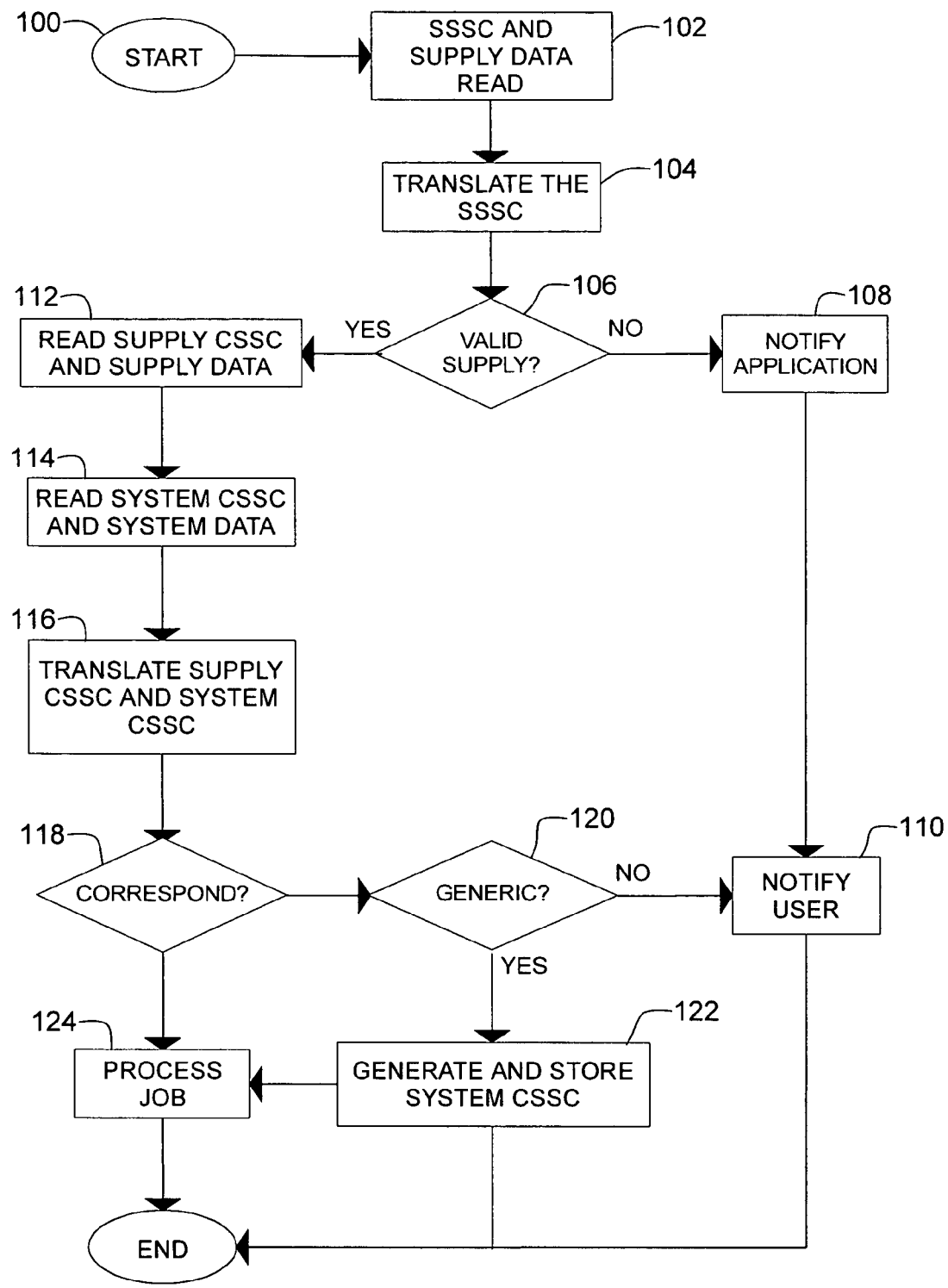
FIG. 5 is a flowchart illustrating a method that can be implemented by the identification card manufacturing system to perform the security checks illustrated in flowcharts of FIGS. 2 and 3.

FIG. 5 is a flowchart illustrating a method that can be implemented by the identification card manufacturing system 10 to perform the above-described security checks. It should be understood that the presented method is only one example of how the desired identification card manufacturing security can be implemented and that additional steps may be added or removed, or be performed in a different order without departing from the spirit and scope of the present invention. The method generally starts at 100 with a request to perform a card processing function, such as process a print job, or perform some other card processing function using identification card manufacturing system 10. This causes application and driver software 14 or controller 22 to request a read of supply memory 28. Next, at 102, controller 22 reads memory 28 of supply 26 using supply reader 30 and either provides the data directly to application 14 or implements the first level of security described above, as indicated at 104, by translating the SSSC 34 using the supply-specific data 32. The supply 26 is then validated by checking whether the translated SSSC 34 matches a corresponding code, such as authorization code 52 stored in system memory 24, as indicated at 106. If the supply 26 is determined to be invalid, the method moves to 108 where controller 22 notifies application 14 that supply 26 is invalid. Additionally, the user of system 10 can be notified that the supply 26 is invalid, as indicated at 110. Identification card manufacturing system 10 is then disabled from use with the supply 26 and the card processing job is terminated.

In accordance with another embodiment of the invention, a second level security check is performed when it is determined at 106 that the supply 26 is valid. At step 112, the supply SSSC 60 is retrieved along with the supply data 32, if necessary. Next, at 114, the system CSSC 62 and system-specific data 64 are retrieved. The supply CSSC 60 and the system CSSC 62 are then translated at 116 using the supply-specific data 32 and the system-specific data 64, respectively.

At 118, a comparison is made between the translated supply CSSC 60 and the translated system CSSC 62 to determine whether they correspond or match. If they do not correspond, it may be due to the system CSSC 62 being a generic code. Accordingly, a check is made to determine whether the system CSSC 62 is generic at 120. If the system CSSC 62 is a generic code, a CSSC corresponding to the supply CSSC 60 is generated and stored in memory 24 at 122. In accordance with one embodiment, the system CSSC 62 is generated using the translated supply CSSC 60, system-specific data 64, and/or a private key. As a result, identification card manufacturing system 10 is thereafter configured to operate only with supplies 26 having the corresponding CSSC.

In the event that the system CSSC 62 is not a generic CSSC, then it has been customized for use with corresponding customized supplies 26 that are different than the supplies 26 being used for the current card processing function. Accordingly, operation of system 10 with the installed supply 26 is prevented and the card processing job is terminated. The user of system 10 can then be notified of the unauthorized supply, as indicated at 110.

In the event that it is determined at 118 that the translated supply CSSC 60 and the translated system CSSC 62 correspond, supply 26 is authorized for use with system 10. The card processing job is, therefore, allowed to commence as indicated at 124.

Although the present invention has been described with reference to preferred embodiments, workers skilled in the art will recognize that changes may be made in form and detail without departing from the spirit and scope of the invention. For example, those skilled in the art understand that the translations of the supply SSSC's and the supply and system CSSC's can be accomplished in many different ways. The general purpose of the translation is to perform some manipulation (decoding, deciphering or decrypting) to the supply SSSC, the supply CSSC, and/or the corresponding reference. The resulting translation is then used to determine whether the supply is authorized for use with the identification card manufacturing system. Accordingly, a translation of a supply SSSC, a supply CSSC, or a system CSSC can involve a direct manipulation of the code and/or a direct manipulation of the corresponding reference that is used to authorize use of the supply with the identification card manufacturing system. For example, the translation of a supply SSSC can involve direct manipulation of: the supply SSSC using the supply-specific data in some manner; the corresponding reference (e.g., authentication code) using the supply-specific data; or both the supply SSSC and the corresponding reference using the supply-specific data. Likewise, the translation of the supply CSSC can involve direct manipulation of: the supply CSSC using the supply-specific data in some manner; the corresponding reference (e.g., the system CSSC) using the supply-specific data; or both the supply SSSC and the corresponding reference using the supply specific data. The translation of the system CSSC can be made in the same manner. Thus, it is possible that the translations of the supply and system CSSC's involve manipulation of only the supply CSSC or the system CSSC.

What is claimed is:

1. A method of authorizing a supply for use with a printing system comprising steps of:
    a) retrieving a supply-specific security code (SSSC) and supply-specific data from a memory of the supply;
    b) translating the SSSC using the supply-specific data;
    c) authorizing use of the supply with the printing system when the translated SSSC is valid;
    d) retrieving a supply customer-specific security code (CSSC);
    e) retrieving a system CSSC and system-specific data;
    f) translating the supply CSSC using the supply-specific data;
    g) translating the system CSSC using the system-specific data; and
    h) authorizing use of the supply with the printing system when the translated system CSSC and the translated supply CSSC correspond.

2. The method of claim 1, wherein the authorizing step c) includes comparing the translated SSSC to a supply authorization code, wherein the translated SSSC is valid when it corresponds to the supply authorization code.

3. The method of claim 1 including i) precluding use of the supply with the printing system when the translated SSSC is not valid.

4. The method of claim 1, wherein the translating step b) includes decoding or decrypting the supply SSSC using the supply-specific data.

5. The method of claim 1, wherein the system CSSC is an application CSSC and the system-specific data is application-specific data.

6. The method of claim 1, wherein the system CSSC is a printing device CSSC and the system-specific data is a printing device-specific data.

7. The method of claim 1 including:
    i) precluding use of the supply with the printing system when the translated supply CSSC and the translated system CSSC do not correspond.

8. The method of claim 1, wherein the supply is a card supply, and ink cartridge, a thermal print ribbon or an overlaminate supply.

9. A method of authorizing use of a supply with a printing system comprising steps of:
    a) retrieving a supply customer-specific security code (CSSC) and supply-specific data from a memory of the supply;
    b) retrieving a system CSSC and system-specific data from a memory of the printing system;
    c) translating the supply CSSC using the supply-specific data;
    d) translating the system CSSC using the system-specific data; and
    e) authorizing use of the supply with the printing system when the translated system CSSC and the translated supply CSSC correspond.

10. The method of claim 9, wherein the system CSSC is an application CSSC and the system-specific data is application-specific data.

11. The method of claim 9, wherein the system CSSC is a printing device CSSC and the system-specific data is printing device-specific data.

12. The method of claim 9 including
    f) precluding use of the supply with the printing system when the translated supply CSSC and the translated system CSSC do not correspond.

13. The method of claim 9, wherein the translating step c) includes decrypting or decoding the supply CSSC using a private key stored in the memory of the printing system.

14. The method of claim 9, wherein the translating step d) includes decrypting or decoding the system CSSC using a private key stored in the memory of the printing system.

15. The method of claim 9, wherein the authorizing step e) includes comparing the translated supply CSSC to the translated system CSSC, wherein the supply is authorized for use with the system when the translated supply CSSC matches the translated system CSSC.

16. The method of claim 9 including:
    f) retrieving a supply-specific security code (SSSC);
    g) translating the SSSC using the supply-specific data;
    h) authorizing use of the supply with the printing system when the translated SSSC is valid.

17. The method of claim 16, wherein the authorizing step h) includes comparing the translated SSSC to a supply authorization code stored in the memory of the printing system, whereby the supply is valid only if the translated SSSC corresponds to the supply authorization code.

18. The method of claim 9, wherein the supply is a card supply, an ink cartridge, a thermal print ribbon or an overlaminate supply.

19. A printing system comprising:

a printing device;

a supply configured for use with the printing device, the supply including a memory containing a supply customer-specific security code (CSSC) and supply-specific data; and an application including instructions executable by a microprocessor comprising:

a) retrieving the supply CSSC and supply-specific data from the memory of the supply;

b) retrieving a system CSSC and system-specific data;

c) translating the supply CSSC using the supply-specific data;

d) translating the system CSSC using the system-specific data; and e) authorizing the use of the supply with the printing device when the translated system CSSC and the translated supply CSSC correspond.

20. The system of claim 19, wherein the supply is a card supply, an ink cartridge, a thermal print ribbon or an overlaminate supply.

* * * * *